United States Patent
Harland et al.

(10) Patent No.: US 11,068,616 B2
(45) Date of Patent: Jul. 20, 2021

(54) SECURE MESSAGE HANDLING

(71) Applicant: Amazon Technologies, Inc., Seattle, WA (US)

(72) Inventors: Jason Alexander Harland, Seattle, WA (US); Vijay Patel, Olympia, WA (US); Nathan Pritchard, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/539,580

(22) Filed: Aug. 13, 2019

(65) Prior Publication Data

US 2019/0370482 A1  Dec. 5, 2019

Related U.S. Application Data

(62) Division of application No. 15/634,970, filed on Jun. 27, 2017, now Pat. No. 10,387,672.

(51) Int. Cl.

| | |
|---|---|
| *G06F 21/00* | (2013.01) |
| *G06F 21/62* | (2013.01) |
| *G06F 11/07* | (2006.01) |
| *G06F 9/4401* | (2018.01) |
| *G06F 13/42* | (2006.01) |

(Continued)

(52) U.S. Cl.
CPC ........ *G06F 21/6218* (2013.01); *G06F 9/4401* (2013.01); *G06F 9/45558* (2013.01); *G06F 11/0709* (2013.01); *G06F 11/0745* (2013.01); *G06F 11/0751* (2013.01); *G06F 11/0772* (2013.01); *G06F 13/4282* (2013.01); *G06F 21/6236* (2013.01); *G06F 21/85* (2013.01); *G06F 21/577* (2013.01); *G06F 2009/45587* (2013.01); *G06F 2221/034* (2013.01)

(58) Field of Classification Search
CPC ............ G06F 11/0709; G06F 11/0745; G06F 11/0751; G06F 11/0766; G06F 11/0772; G06F 13/4282; G06F 2009/45587; G06F 21/577; G06F 21/6218; G06F 21/6236; G06F 21/85; G06F 2221/034; G06F 9/4401; G06F 9/45558; H04L 63/0236; H04L 63/1425; H04L 43/028; H04L 45/70; H04W 12/088

See application file for complete search history.

(56) References Cited

U.S. PATENT DOCUMENTS

| | | |
|---|---|---|
| 8,769,682 B2 | 7/2014 | Choyi et al. |
| 10,242,176 B1 * | 3/2019 | Sathyanarayana ...... G06F 13/42 |

(Continued)

*Primary Examiner* — Joseph P Hirl
*Assistant Examiner* — Ka Shan Choy
(74) *Attorney, Agent, or Firm* — Klarquist Sparkman, LLP

(57) ABSTRACT

Systems and methods in accordance with various embodiments of the present disclosure provide secure handling of messages at a hardware-protocol level using a logic device on a server. Various embodiments provide approaches for filtering messages on various buses, such as SSIF, SMBus, PMBus, I2C, and SPI, within a server or a computer. Embodiments may include a policy engine through which message handling logic applied to a given bus or buses may be implemented. A message is compared to one or more policies. The message is allowed to be transmitted to a baseboard management controller based on the one or more policies and a type of message.

20 Claims, 8 Drawing Sheets

(51) Int. Cl.
  *G06F 9/455* (2018.01)
  *G06F 21/85* (2013.01)
  *G06F 21/57* (2013.01)

(56) References Cited

U.S. PATENT DOCUMENTS

| | | |
|---|---|---|
| 2007/0107059 A1 | 5/2007 | Chasin et al. |
| 2009/0300353 A1 | 12/2009 | Hart |
| 2012/0136970 A1* | 5/2012 | Chen .................. G06F 11/0784 709/219 |
| 2013/0347095 A1* | 12/2013 | Barjatiya ................ H04L 43/08 726/13 |
| 2014/0280947 A1* | 9/2014 | Christopher ............ H04L 61/00 709/226 |
| 2016/0065331 A1* | 3/2016 | Choi .................. G06F 11/1004 714/748 |
| 2018/0115514 A1* | 4/2018 | Chou ..................... H04L 63/20 |

* cited by examiner

SECURE MESSAGE HANDLING

CROSS-REFERENCE TO RELATED APPLICATION

This is a divisional of U.S. application Ser. No. 15/634,970, filed Jun. 27, 2017, which application is incorporated herein by reference in its entirety.

BACKGROUND

Cloud computing is the use of computing resources (hardware and software) which are available in a remote location and accessible over a network, such as the Internet. Cloud computing provides a model for multi-tenant access to a shared pool of configurable computing resources such as servers, storage services, and computer networks. Users are able to buy or rent these computing resources (including storage and computing power) as a utility on demand. Cloud computing entrusts remote services with a user's data, software and computation.

Typically, a cloud computing environment includes systems on which code pertaining to requirements of a user is executed. The cloud computing environment further includes separate subsystems that manage error handling, platform management and logging of system behavior. One example of such an error is a firmware error; however, any systemic error, such as errors arising due to faults in connections of hardware with peripheral components or a fault in a memory, is typically logged and a message is sent to the error handling subsystems for appropriate corrective action.

In some instances, an open protocol bus may exist between resource being used by a tenant and one or more of the firmware error handling subsystems, leaving the firmware error handling subsystem vulnerable to errant or malicious messages.

DETAILED DESCRIPTION

Figure 1:
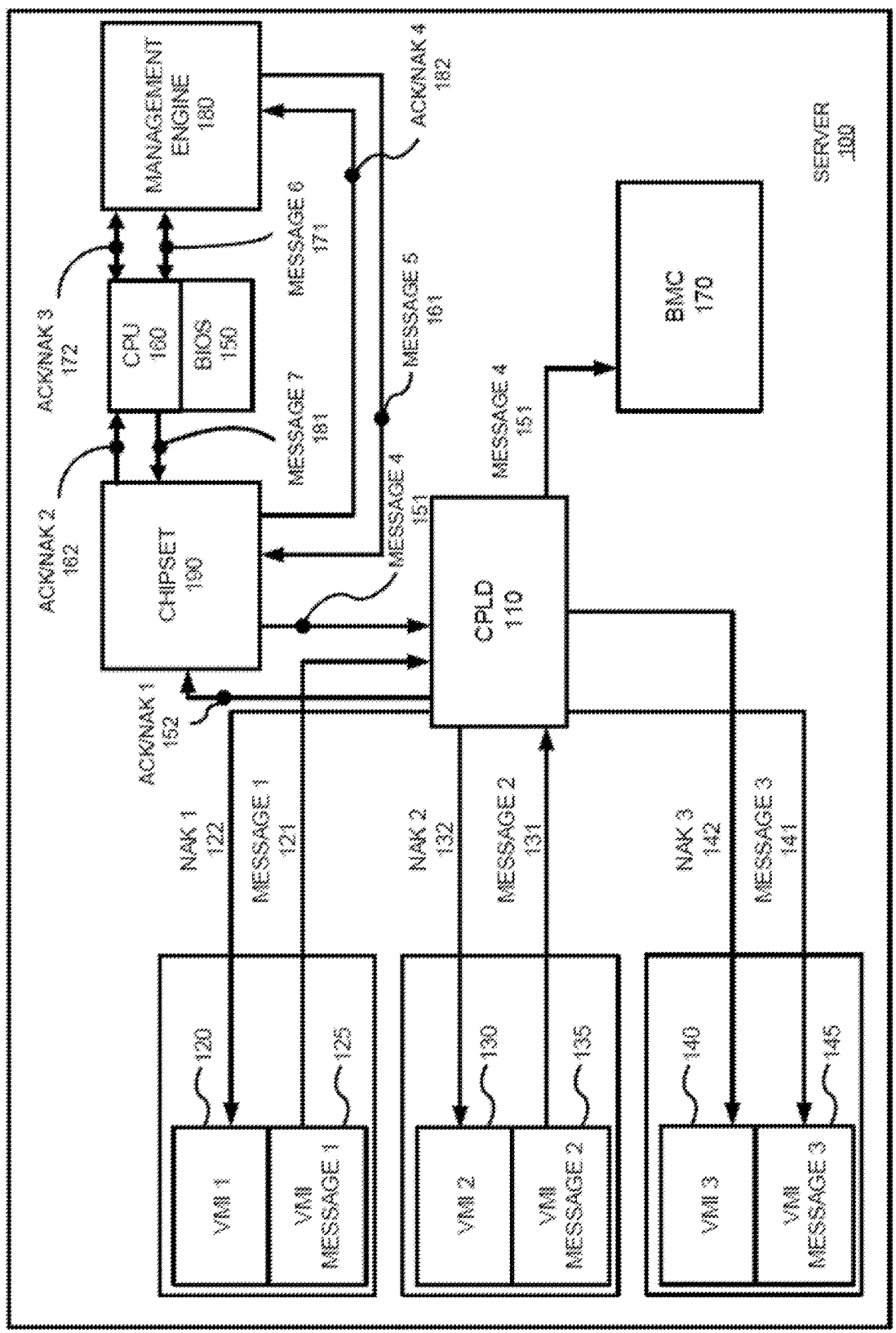
FIG. 1 is an example system showing the internal connection flow within a server in accordance with an embodiment of the disclosure.

In this disclosure, new systems and methods of handling secure firmware messages are disclosed. For example, the disclosure describes a novel method to route and filter error messages in a computer server, such as by performing message filtration on an I2C protocol bus. These messages could include CPU BIOS (firmware) error messages previously transmitted over a (first) data bus, such as a low pin count (LPC) bus, which are now being transmitted over a second data bus (usually an I2C bus). The disclosure further describes an additional filter layer employing one or more logic devices used to exclude non-authenticated error messages on the second bus from accessing a baseboard management controller (BMC) running in accordance with a service provider's architecture. However, the techniques described in the disclosure are not limited to filtering messages attempting to access the BMC, and may refer to any form of messaging authentication and filtration in or across any number of network components.

Messages are usually determined to be authentic if the logic device determines that they are error messages and of a certain message type. BIOS error messages and other hardware messages are the most typical messages to be authenticated for passage/access to the BMC. However, in other circumstances, the messages may not explicitly be error messages, but instead other control plane messages of a various message types which may be allowed to access the BMC. These messages could include messages relating to the read event buffer, power state, or any other control plane message. Control plane messages are generally characterized as being low-level messages that the BMC may need in order to maintain its normal operation.

The logic device can be an inline subsystem that operates on the previously mentioned second data bus (usually an I2C bus), and may be a programmable logic device (PLD) or complex programmable logic device (CPLD), that is capable of providing error message handling and logging, such as transmission, blocking, isolation, and authentication of error messages in addition to various other control plane messages. As mentioned above, the logic device could encompass any variety of logic devices such as an application specific integrated circuit (ASIC), a field programmable gate array (FPGA), a processor or microprocessor, or any other form of configurable digital logic hardware or software (such as a software radio component), etc.

In the following description, various embodiments will be illustrated by way of example and not by way of limitation in the figures of the accompanying drawings. References to various embodiments in this disclosure are not necessarily directed to the same embodiment, and such references usually mean at least one. While specific implementations and other details are discussed, it is to be understood that this is done for illustrative purposes only. A person skilled in the relevant art will recognize that other components and configurations may be used without departing from the scope and spirit of the claimed subject matter.

In a cloud computing system using hardware protocols pertaining to Intelligent Platform Management Interface (IPMI) specifications, hardware components, software components, clients and/or customers can initiate service requests to (or on) servers. The servers process the requests and return appropriate responses. In this context, a service can be a software function provided at a network address over a network. In some embodiments, messages may be sent from a management engine or a CPU on the server on or through a chipset on the server. The chipset may then relay any received messages to the BMC and may in turn receive a "message acknowledged" or "ACK" message, or alternatively may receive a "message not acknowledged" or "NAK" message, indicating whether the message was permitted access to the BMC. In other embodiments, one or both of the CPU and/or management engine are disposed within the chipset itself, which still performs the above-noted operations. Messages usually qualified for authentication are known as control plane messages as they originate from the control plane of the server (as opposed to the data plane, which is usually reserved for client/tenant usage), but this need not always be the case, as the data plane messages could also include authenticated messages that are allowed to access the BMC. Control plane messages that pertain to errors are authorized to communicate with/access the BMC.

The chipset may transmit messages received from the server CPU or management engine over a data bus using any protocol. In this disclosure, for convenience, the data bus is referred to as an I2C protocol bus, and the protocol is assumed to be an IPMI protocol, but is not necessarily limited in this regard. Additionally, the message may further utilize a derivative of IPMI referred to as SMBus System Interface (SSIF) protocol while the message is in transit to the BMC. This configuration is often referred to as SSIF over I2C. However, other protocols such as PCI-e, LPC or any other protocol could be adapted to perform the disclosed functionality.

In the course of the claimed processes, messages passing through a logic device such as a CPLD can be identified as control plane error messages, and may be more specifically identified by a message type that the logic device is configured to flag for passage (or blocking). Messages such as firmware error messages pertaining to Peripheral Component Interconnect Express (PCI-E), memory faults, and/or Basic Input/Output System (BIOS) related anomalies, and others may occur and become flagged by the logic device for passage or blocking. As further described below, control plane messages will be frequently referred to simply as error messages (often BIOS error messages). These are more frequently observed than other control plane error messages. Other related control plane messages such as read event buffer messages, power state messages, and others could also constitute a family of generic messages that may be allowed or blocked by the logic device.

In some embodiments, the Baseboard Management Controller (BMC) manages error handling and an interface between system management software and platform hardware. Message handling can refer to the anticipation, detection, and resolution of programming, application, and communications messages, including error messages, in computing systems. These messages often occur in cloud computing environments and/or networking systems. Specialized programs, identified as message handlers, are available for some applications. Message handlers are designed to resolve the various events reported in control plane messages without terminating the application, or alternatively by terminating an affected application and saving the message information to a log file in the BMC. In accordance with IPMI specifications, standard messages and alerts may also be transmitted to the BMC, but may not gain access and receive a "NAK" in response. An administrator or a client, in accordance with IPMI specifications, may send queries relating to system status apart from notifying the BMC of any prevalent errors. Message handling may be made more secure by isolating control plane message handling activities from other processes or messages stemming from any portion of the network including tenant controlled virtual machine instances, policies, information, etc.

Systems and methods in accordance with various embodiments of the present disclosure provide secure error message handling at a hardware-protocol level. For example, a programmable logic device implements a secure firmware message handling process to filter out messages which are not control plane error messages. Various embodiments provide approaches for filtering messages on various buses, such as a System Management Bus (SMBus), a Power Management Bus (PMBus), an Inter-Integrated Circuit (I2C), and a Serial Peripheral Interface (SPI) bus, within a server or other computer. Embodiments may include a policy engine through which message handling logic applied to a given bus or buses may be implemented. When a message is received, one or more attributes of the message, such as a message type, may be compared to one or more access policies. If there is a match, the message may be allowed to be transmitted to a BMC, or denied access, depending on the match.

Various embodiments of the present inventions are presented by way of examples illustrated in the FIGS. 1-8.

FIG. 1 is a system diagram of an individual server 100 that, in some cases, may reside in tandem amongst a plurality of servers 202A-C (see FIG. 2) in a compute service provider 200 in accordance with an embodiment of the disclosure. In some embodiments, each of the elements depicted in FIG. 1 are assumed to reside on the server 100, though this may not always be the case, as each element may be distributed over multiple servers, networks, etc., and could reside in numerous permutations of hardware and software resource configurations. The number of servers 100 is not particularly limited, and may include ones, tens, hundreds, or even thousands of servers 100 networked together in the compute service provider 200.

In FIG. 1, a possible solution for protecting the BMC 170 from various external threats is illustrated. FIG. 1 depicts virtual machine instances (VMI's) 120, 130, and 140, a logic device CPLD 110 coupled to the VMI's 120, 130 and 140, and also coupled to a chipset 190 and the BMC 170. The chipset 190 is further coupled to a server central processing unit (CPU) 160 having a BIOS 150 and a management engine 180. In some embodiments the chipset may be separate from the CPU 160, BIOS 150, and management engine 180, while in others either or all of the CPU 160, BIOS 150, and management engine may reside within the chipset 190.

The various interconnections maintained between each of the elements are also illustrated in FIG. 1 as messages 1-7 (121, 131, 141 151, 161, 171, and 181, respectively), and ACK/NAK responses 122, 132, 142, 152, 162, 172 and 182. As previously discussed, "ACK" stands for a positive "acknowledgment" of successful message transmission and "NAK" stands for a negative acknowledgement of successful message transmission. Messages may be NAK'd for any number of reasons, such as the message being identified as being un-authorized, improperly formatted, timed-out, or any other reason. In certain embodiments, only authorized control plane error messages, whose message type may be identified and compared to various other message types stored in an access policy, may be transmitted to or given access to the BMC 170.

In FIG. 1, chipset 190 acts as a gateway between the CPLD 110 and the upstream components CPU 160, BIOS 150, and the management engine 180, and the downstream component BMC 170. Similarly, the CPLD 110 acts as a gateway between the chipset 190 (control plane) and the VMI's 1-3 120, 130, and 140 (data plane).

As will be known to one of skill in the art, messages usually contain elements such as a message type, metadata, headers, payloads, etc. Each of these elements could be used to categorize and process the various messages. As can be seen in FIG. 1, the CPU 160/BIOS 150 and the management engine 180 can each be in communication messages with each other, and may each also be in direct communication with the chipset 190. For example, it is possible for the management engine 180 and the CPU 160 to communicate a message without including the chipset 190, such as relaying a message such as message 6, 171 and an ACK/NACK 3, 172. More commonly, however, the CPU 160 may transmit a message such as message 7, 181 to the chipset 190 (such as a BIOS error) for forwarding through the chipset 190 to the CPLD 110. If the message is authorized, the CPLD 110 may then forward message 4, 151 to the BMC 170 where it is logged. Any other communications permutation is also allowed. For example, the management engine 180 could directly send a message such as message 5, 161 to the chipset 190, or could send a message such as message 6, 171 through the CPU 160 in transit to the chipset 190. In any event, an ACK/NAK 1-4 (152, 162, 172, and 182, respectively) could be generated for delivery to the originating message component. As previously disclosed, each of these messages/responses are channeled through the chipset 190 over an I2C protocol bus using an SSIF (SSIF over I2C) protocol. Messages that are authorized are transmitted as message 4, 151 to the BM 170, which may separately generate an ACK/NACK to the CPLD 110 (not shown).

Also shown in FIG. 1 are VMI's 120, 130, and 140. Each VMI can also generate messages 121, 131, and 141 that can propagate by any means, but typically propagate over a standard bus, such as PCI, LPC, I2C, etc. in transit to the CPLD 110. It can sometimes be useful to use a separate data bus for VMI messages than is used by the chipset 190 to increase isolation between the data plane and the control plane, but this is not always necessary, and in some cases it may be more economical to use the same bus (such as the I2C bus).

In some instances, as depicted in FIG. 1, the VMI's 120, 130 and 140 may initiate query or command messages 121, 131, and 141 directed towards the BMC 170. Because the BMC 170 is frequently a repository of sensitive source code, providing various configuration, identification and storage instructions for the tenants of the multi-tenant network, it is desirable to dispose a barrier between the BMC 170 and any unnecessary, malicious, or errantly delivered messages.

The CPLD 110 can provide such a barrier by protecting the BMC 170 from any message that falls outside of the realm messages that are allowed to be transmitted to the BMC 170. For example, messages 1-3 (121, 131, and 141) may contain data intended to disrupt the normal operation of the BMC 170, such as commands to change its operation by altering the source code of the BMC 170, attempting to access tenant data via the BMC 170, or by shutting the BMC 170 down altogether. Additionally, malicious players may not attempt to disrupt BMC 170 operation, but may attempt to read (i.e. steal) proprietary code from the BMC 170. Alternatively, messages 121, 131, and 141 may simply comprise overhead network traffic unnecessary to the BMC 170, or may just be universally broadcast IP messages with no relevance to the BMC 170 operations whatsoever.

As illustrated in FIG. 1, in protection of unwanted access to the BMC 170, the CPLD 110 is disposed in stream of the data traffic between the VMI's 120, 130, 140, the chipset 190, and the BMC 170. The CPLD 110 may be configured in any fashion, and can allow specific messages, specific message types, headers, or metadata, content, or any other identifying information to be allowed or blocked by the CPLD 110. In an embodiment, the CPLD 110 allows only messages such as message 4, 151 from the chipset 190 (including messages originating from the CPU 160 such as BIOS 150 errors, CPU 160 or management engine 180 messages, etc.) to propagate to the BMC 170. Errant, malicious, redundant, or irrelevant messages such as messages 121, 131, and 141 are NAK'd (NAK 1-3, messages 122, 132, and 142) to protect the BMC 170 asset from each of the threats mentioned above. As previously discussed, the CPU 160 may suffer from a BIOS 150 error which may need to be given direct access to the BMC 170 for a corrective response. In this instance, the CPLD 110 decides if the message is an authenticated control plane error message (such as a BIOS error message), and depending on the determination, take any necessary action (if applicable). The message type (such as being a control plane error message) may be identified by any portion of the submitted message such as in the message metadata, header, payload, origin (such as an IP address or memory location), etc. Once such a genuine message is received, the CPLD 110 can allow passage of the message to the BMC 170, and may also send an ACK (ACK/NAK 1, 152) to the chipset 190 notifying it that the message has been received and was transmitted to the BMC 170. Alternatively, if the message is unauthorized (regardless of source), a NAK is generated by the CPLD 110 indicating to the originating source that the message was not delivered to the BMC 170. As noted in FIG. 1, messages from the control plane are not always automatically ACK'd, depending on whether or not they are error messages, otherwise authorized control plane messages, or neither. For this reason, control plane messages may receive ACK/NAK 1-3 (152, 162, and 172). However, messages originating from VMI's 120, 130 and 140 are always NAK'd (NAK 1, 122, NAK 2, 132, and NAK 3, 142) for security reasons.

Figure 2:
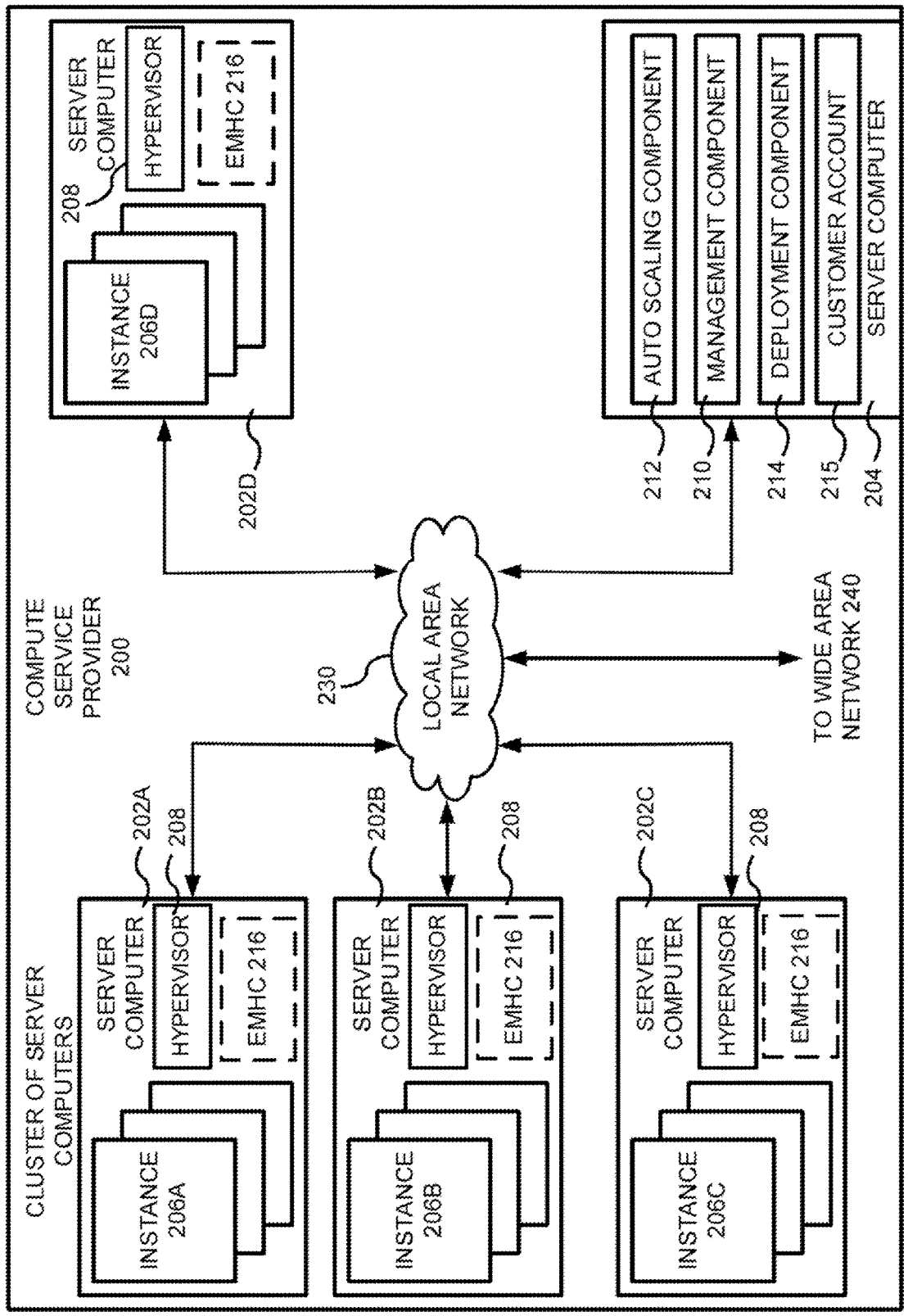
FIG. 2 is an example system diagram showing an overall view of a compute service provider environment with an error messaging handling component (EMHC)

FIG. 2 illustrates a computing system diagram of a network-based compute service provider 200 that illustrates one environment in which embodiments described herein can be used. The compute service provider 200 (i.e., the cloud provider, see FIG. 2) is capable of delivery of computing and storage capacity as a service to a community of end recipients. In an example embodiment, the compute service provider can be established for an organization by, or on behalf of the organization. That is, the compute service provider 200 may offer a "private cloud environment." In another embodiment, the compute service provider 200 supports a multi-tenant environment, wherein a plurality of customers operate independently (i.e., a public cloud environment). Generally, the compute service provider 200 can provide various models, not limiting to, Infrastructure as a Service ("IaaS"), Platform as a Service ("PaaS"), and/or Software as a Service ("SaaS"). For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

The illustrated compute service provider 200 includes a plurality of server computers 202A-202D. Each of these server computers may possess an error messaging handling component (EMHC) 216 such as the previously described CPLD 110. While only four server computers are shown in FIG. 2, any number can be used, and large centers can include thousands of server computers. The server computers 202A-202D can provide computing resources for executing software instances 206A-206D such as VMI's 120, 130, and 140. In one embodiment, the instances 206A-206D are virtual machines. As known in the art, a virtual machine is an instance of a software implementation of a machine (i.e. a computer) that executes applications like a physical machine. Each of the servers, 202A-202D may be configured to execute a hypervisor 208 or another type of program configured to enable the execution of multiple instances 206 on a single server. Additionally, each of the instances 206 may be configured to execute one or more applications. The EMHC 216 is capable of distinguishing between authorized control plane error messages (usually BIOS error messages) and unwanted, errant, malicious or otherwise unauthorized messages that may be generated by instances 206A-C or which could be generated elsewhere in the network, including in the control plane. Each of the servers 202A-D may be connected to a wide area network 240 via the local area network 230.

It should be appreciated that although the embodiments disclosed herein are described primarily in the context of virtual machine messages 125, 135 and 145 and chipset 190 messages 150, other types of instances and messages may be utilized with the concepts and technologies disclosed herein. For example, the technologies disclosed herein may be utilized with storage resources, data communications resources, and with other types of computing resources. The embodiments disclosed herein might also execute all or a portion of a message filtering application directly on a computer system irrespective of the origin of the message or its content.

One or more server computers 204 may be reserved for executing software components or firmware for managing the operation of the server computers 202 and the instances 206. For example, the server computer 204 may execute a management component 210. A customer may access the management component 210 to configure various aspects of the operation of the instances 206 purchased by the customer. For example, the customer may purchase, rent or lease instances and make changes to the configuration of the instances. The customer may also specify settings regarding how the purchased instances are to be scaled in response to demand. The management component may further include a policy document to implement customer policies. This policy document may include any number of message restrictions ranging from message types, memory addresses or any other information pertinent to the message such as metadata, payload, header information, etc. In accordance with various embodiments, messages from the instances 206 may be filtered out by the CPLD 110 from accessing the BMC 170.

An auto scaling component 212 may scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 may consist of a number of subcomponents executing on different server computers 202 or other computing devices. The auto scaling component 212 may monitor available computing resources over an internal management network and modify resources available based on need. The management component 210 may tally and control the number of scaled up or scaled down instances to determine metadata, header, or other information considered when filtering messages through the error message handling component 216. Alternatively, the auto-scaling component 212 or the deployment component 214 may handle this task.

The deployment component 214 may primarily be used to assist customers in the deployment of new instances 206 of computing resources. The deployment component may have access to account information associated with the instances, such as who is the owner of the account, credit card information, country of the owner, etc. The deployment component 214 may receive a configuration from a customer that includes data describing how new instances 206 should be configured. For example, the configuration may specify one or more applications to be installed in new instances 206, provide scripts and/or other types of code to be executed for configuring new instances 206, provide cache logic specifying how an application cache should be prepared, and other types of information. The deployment component 214 may utilize the customer-provided configuration and cache logic to configure, prime, and launch new instances 206. The configuration, cache logic, and other information may be specified by a customer using the management component 210 or by providing this information directly to the deployment component 214. The instance manager may be considered part of the deployment component.

Customer account information 215 may include any desired information associated with a customer of the multi-tenant environment. For example, the customer account information may include a unique identifier for a customer, a customer address, billing information, licensing information, customization parameters for launching instances, scheduling information, auto-scaling parameters, and previous IP addresses used to access the account, etc.

A network 230 may be utilized to interconnect the server computers 202A-202D and 204. The network 230 may be a Local Area Network (LAN) and may be connected to a Wide Area Network (WAN) 140 so that end users may access the compute service provider 200. In certain embodiments, the network 230 may include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc. In some embodiments, the network 230 may include or otherwise cover networks or subnetworks, each of which may include, for example, a wired or wireless data pathway. The network 230 may include a circuit-switched voice network, a packet-switched data network, or any other network capable for carrying electronic communications. For example, the network 230 may include networks based on the Internet protocol (IP) or asynchronous transfer mode (ATM), and may support voice usage, for example, VoIP, Voice-over-ATM, or other comparable protocols used for voice data communications. In one implementation, the network 230 includes a cellular telephone network configured to enable exchange of text or Short Message Service (SMS) messages. It should be appreciated that the network topology illustrated in FIG. 2 has been simplified and that many more networks and networking devices can be utilized to interconnect the various computing systems disclosed herein.

Figure 3:
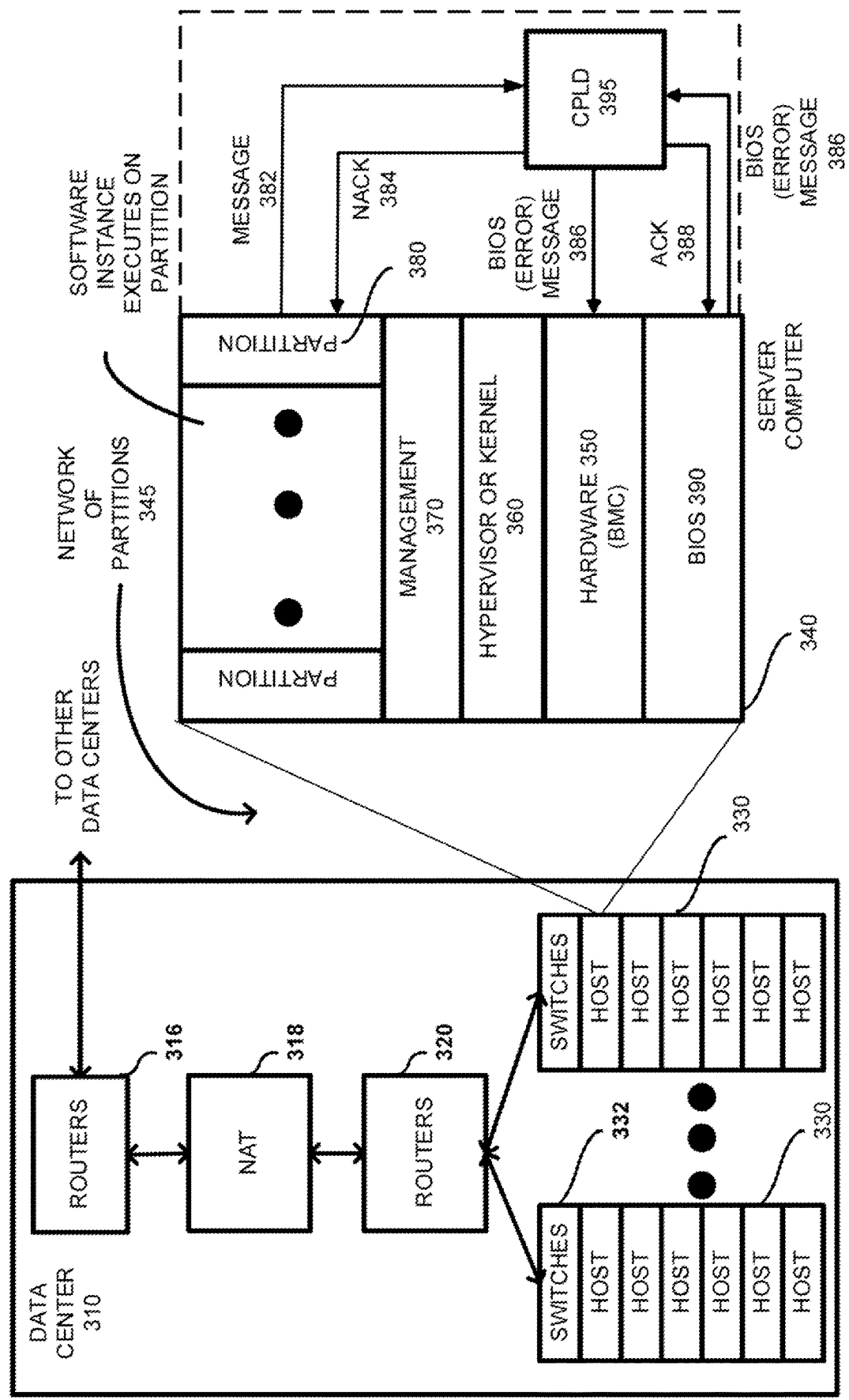
FIG. 3 illustrates an example of a plurality of host computers, routers and switches, which are hardware assets used for running virtual machine instances, and the connections between the CPLD, VMI instances, and hardware.

FIG. 3 illustrates the network of partitions 345 and the physical hardware associated therewith. The network of partitions 345 may include a plurality of data centers, such as data center 310, coupled together by routers 316. The physical hardware may be housed on a chassis or multiple chassis. The plurality of data centers may be managed with system software based on Data Center Management Interface (DCMI) specifications. The routers 316 read address information in a received packet and determine the packet's destination. If the router decides that a different data center contains a host server computer, then the packet is forwarded to that data center. If the packet is addressed to a host in the data center 310, then it is passed to a network address translator (NAT) 318 that converts the packet's public IP address to a private IP address. The NAT 318 also translates private addresses to public addresses that are bound outside of the data center 310. Additional routers 320 may be coupled to the NAT 318 to route packets to one or more racks 330 of host server computers. Each rack 330 may include a switch 332 coupled to multiple host server computers. In FIG. 3, a particular host server computer 340 is shown in an expanded view.

Each host server computer 340 has underlying hardware 350 including one or more CPUs, memory, storage devices, etc. including a BIOS 390 interface that usually occupies a portion of the hardware 350 layer, and/or flows through or interacts with hardware 350 layer. Additionally, the CPLD 395 also usually resides in a portion of the server computer 340 hardware 350, although it is illustrated separately in FIG. 3 for illustrative value. Furthermore, the BMC usually resides in hardware 350 as illustrated.

In FIG. 3, the flow of messaging is illustrated from a different perspective than FIG. 1. As illustrated in FIG. 3, a CPLD 395 may receive messages 382 from partitions 380 (VMI instances), in addition to receiving messages 386 originating from the control plane, such as errors originating from the BIOS 390. In the case of partitions 380, messages 382 attempting to access, command, read or write in accordance with the hardware BMC 350 are NACK'd (384) or otherwise rejected because they could compromise the health, performance, or content of the BMC portion of the hardware 350. Alternatively, messages originating from errors in the BIOS 390 directed to the BMC portion of the hardware 350 are allowed passage, and the hardware receives an "ACK" 388 or is otherwise allowed. (It is noted that the BIOS 390 is usually a subset of the hardware 350, and is usually not an independent component from the hardware 350). In this way, only BIOS 390 related errors 386 are allowed to interact with the BMC portion of the hardware 350, effectively shielding the BMC portion of the hardware 350 from all other external messages that could cause undesirable consequences. An advantage of this structure is that customers running virtual machines cannot access the BMC portion of the hardware 350 and cannot, therefore, compromise the compute service provider 200 functionality. Such a structure also helps to assure that any given customer cannot access data from another customer operating a separate virtual machine instance, nor any other assets relating to the server computer 340.

Running a layer above the hardware 350 is a hypervisor or kernel layer 360. The hypervisor or kernel layer 360 may be classified as a type 1 or type 2 hypervisor. A type 1 hypervisor runs directly on the hardware 350 to control the hardware and to manage operating systems. A type 2 hypervisor runs within a conventional operating system environment. Thus, in a type 2 environment, the hypervisor may be a distinct layer running above the operating system and the operating system interacts with the system hardware. Different types of hypervisors include Xen-based, Hyper-V, ESXi/ESX, Linux, etc., but other hypervisors may be used. A management layer 370 may be part of the hypervisor or separated therefrom and generally includes device drivers needed for accessing the hardware 350. The host server computer 340 includes partitions 380 that are logical units of isolation by the hypervisor 360. Each of the partitions 380 may be allocated its own portion of the hardware layer's memory, CPU allocation, storage, etc. Additionally, each partition may include a virtual machine and an operating system. As such, each partition is an abstract portion of capacity designed to support a virtual machine independent of the other partitions.

Any applications executing on the instances may be monitored using the management layer 370, which may then pass any metrics pertaining to the execution to a health monitoring service (not shown). As previously described, the number and identification of spawned or terminated instances may be recorded for future message comparison in the CPLD 395. Metrics associated with instances pertaining to performance, memory, availability, or any other such metrics may be subsequently evaluated by a health monitoring service and eventually stored in a database.

Figure 4:
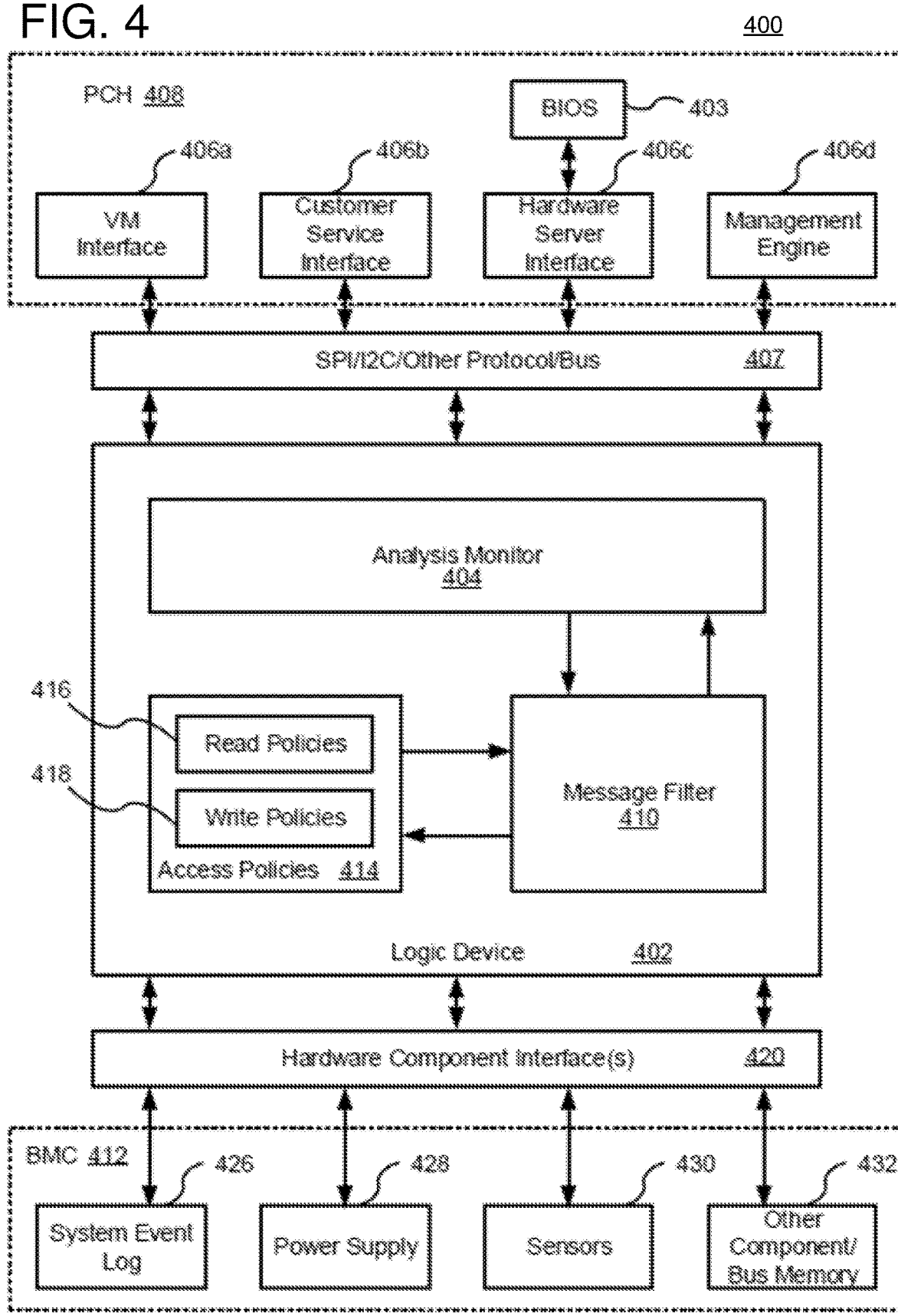
FIG. 4 illustrates an example of a programmable logic device, in accordance with an embodiment.

FIG. 4 illustrates a computing device 400 with a logic device 402, in accordance with various embodiments. As shown in FIG. 4, the logic device 402 is equipped to securely filter messages received over various internal interfaces such as VMI's 120, 130, 140, chipset 190 (here illustrated as PCH 408), such as non-error messages and others. Although the logic device 402 is communicably coupled to the chipset 190 (shown in FIG. 1), in some embodiments a different configuration such as a Platform Controller Hub (PCH 408) may be utilized as illustrated in FIG. 4. The PCH 408 is similar to the chipset 190; however, the PCH 408 may physically house one or more of the previously discussed elements, such as management engine 406d, which are internally incorporated for efficiency and speed. The PCH 408 communicates over a bus 407 running a protocol, for example, I2C, PCI-e, I2C, SMBus, SMBus System Interface (SSIF), Intelligent Platform Management Bridge/Bus (IPMB), PMBus, SPI, Intelligent Chassis Management Bus (ICMB) or any other protocol. As previously mentioned, embodiments disclosed in this application typically utilize an SSIF over I2C protocol between the PCH 408 and the logic device 402, although ultimately, the selection of busses and protocols usually depends on the availability of hardware and/or software assets or constraints.

One possible advantage of the strategies employed by computing device 400 is that messages exchanged via the SSIF protocol on the I2C protocol bus 407 may be filtered much more rapidly at the hardware layer than could be accomplished at a software layer of the computing device 400. However, as mentioned above, filtering exclusively on the I2C bus is not strictly necessary. An additional possible advantage is that a BMC 412 responsible for error message handling is effectively isolated from the user. Indeed, the BMC 412 is protected from any messages not relating to control plane messages, including error messages (usually BIOS 403 error messages), and thus the BMC 412 is less vulnerable to malicious message attacks or errant message traffic.

The logic device 402 includes an analysis monitor 404 to monitor messages received from various sources over various different interfaces 406a-406d. For example, as shown in FIG. 4, messages may be received from virtual machines through a VM interface 406a. In some embodiments, messages may be received from customer software applications running on the client device 202 (shown in FIG. 2) through a customer application interface 406b. Messages may also be received from a hardware server through a hardware server interface 406c. Messages may also be received from the management engine 406d and transmitted over the protocol bus 407. In some instances, error messages originating from BIOS 403 may also be communicated through the hardware interface server 406c to the bus 407.

In some embodiments, the logic device 402 implements secure firmware message handling by passing messages received from a BIOS 403 of the hardware server through the hardware server interface 406c to the BMC 412. Additionally, messages generated by the management engine 406d may be authenticated and passed to the BMC 412. Usually, messages that are successfully transmitted to the BMC 412 may be logged in the system event log 432. Such messages may be utilized downstream in various automation and/or hardware utilities, possibly to address the logged error. The firmware may be present on the BIOS 403. Error messages are allowed to be transmitted to a BMC 412 through a hardware component interface 420 or directly through the protocol bus 407. In either case, the error messages received may not be encrypted. Therefore, existing buses, such as the bus 407, may be used for transmitting the error messages.

The VM interface 406a, the customer software interface 406b, the hardware server interface 406c, and the management engine 406d form parts of the PCH 408. The PCH 408 may be a server that includes a number of different interfaces used to connect to various devices. For example, a motherboard may include I2C interfaces to connect to EEPROMs, sensors, etc.

In some embodiments, logs of system behavior, logs of errors relating to firmware errors on the BIOS 403, logs relating to platform management and the like may be transmitted to a baseboard management controller 412 from the interfaces 406a-406d to be recorded in the system event log 412. Based on access policies 414, BIOS error messages may be allowed to be transmitted to the BMC 412, through the hardware component interface 420, usually over an I2C bus. All other messages may be filtered.

In some embodiments, the hardware component interface 420 may be a physical layer of a network that can transmit data over a physical link to the BMC 412. In some other embodiments, the hardware component interface 420 may be an electrical connection linking the BMC 412 with the logic device 402. The BMC 412 is a specialized processor that monitors the physical state of the computing device 400 using sensors 428. The BMC 412 further includes connections for a power supply 426, sensors 428, a memory 430 and/or other components, though each of these elements is optional with regard to the claimed invention.

As shown, logs of errors or error messages from the various interfaces 406a-406d may be received over the bus 407 running a protocol, for example, I2C, SMBus, SSIF, PMBus, SPI, or any other protocol.

The logic device 402 may be deployed in an application-specific integrated circuit (ASIC), complex programmable logic device (CPLD), field programmable gate array (FPGA) or other device which may be configured to filter messages on a bus. Messages may include error messages containing data components relating to a message type, responder address, a SMBus command, length of the message, a network function code, an IPMI command, a memory location, etc. The messages may be received by the logic device 402 over a hardware-level protocol, for example, SSIF protocol. An example of an SSIF packet format pertaining to an error message is shown below in Table 1. For single-part writes and the first packet of multi-part writes, the message type is determined by the Network:

TABLE 1

Example SSIF Packet Format

| Byte position | Field name | State machine implication |
|---|---|---|
| 0 | Responder (target) slave address | May be considered |
| 1 | SMBus command | 0x02/0x06 - single-part write or first packet of a multi-part write<br>0x07 - middle or end write, always allowed<br>0x0A - read retry, always allowed<br>All others - further written bytes disallowed |
| 2 | Length | None |
| 3 | Network Function code/LUN | Bits 1:0 - Logical Unit Number, ignored<br>Bits 7:2 - NetFn |
| 4 | IPMI Command | Command code from filter table, considered in combination with NetFn to determine message type |
| etc. | 0 or more data bytes | None |
|  | Checksum | None |

An example of an Intelligent Platform Management Bus (IPMB) packet format pertaining to a message format is shown below in Table 2. The message type is determined by the Network Function (NetFn) code and command fields noted.

TABLE 2

Example IPMB Packet Format

| Byte position | Field name | State machine implication |
|---|---|---|
| 0 | Responder (target) slave address | May be considered |
| 1 | Network Function code/LUN | Bits 1:0 - Logical Unit Number, ignored<br>Bits 7:2 - NetFn<br>If NetFn[0] is 1, it is a response and always allowed |
| 2 | Checksum | None |
| 3 | Requester slave address | None |
| 4 | Sequence/LUN | None |
| 5 | Command | Command code |
| etc. | 0 or more data bytes | None |
|  | Checksum | None |

The logic device 402 may analyze each message, including the type of error message, the memory address or the register being accessed, and determine whether to allow the message to be transmitted to the BMC 412.

The message may include details regarding the nature of an error, along with the registers or memory addresses associated with the message and a command indicative of an action pertaining to rectifying the error. The analysis monitor 404 may pass these details to a message filter 410. The message filter 410 may then use access policies 414 to determine whether the message is allowed. This may be performed in real-time, as data is in transit. In some embodiments, the access policies 414 may include read policies 416 and write policies 418, defined for read and write operations, respectively. The policies may be stored as truth tables or other data structures. These policies may define addresses, devices, or buses over which messages may or may not be allowed. An access policy 414 may define one or more actions to be performed for a type of message for an address or range of addresses or a memory location.

The following table (Table 3) includes a list of some PMBus transactions that can be used when the logic device 402 makes filtration decisions.

puter Usage per Second (CUPS). Error messages pertaining to CPU details may be required for a debugging process.

Alternatively, various other error messages with commands such as "replacing a time delay switch" may not match one of the access policies 414. Therefore, this message would be blocked. In another example, an error message is received from the customer software interface 406b or the VM interface 406a. The error message includes a command to set a watchdog timer of the BMC 412. The watchdog timer of the BMC 412 is used if the computing device 400 or any server coupled to the PCH 406 needs to

TABLE 3

Example PMBus Transactions

| Byte | Write Byte | Write Word | Write Block | Read Byte | Read Word | Read 32 | Read Block | Block Write-Block Read Process Call |
|---|---|---|---|---|---|---|---|---|
| 0 | Slave address/Write | SA/W | SA/W | SA/W | SA/W | SA/W | SA/W | SA/W |
| 1 | PMBus command code (cmd) | Cmd | Cmd | Cmd | Cmd | Cmd | Cmd | Cmd |
| 2 | Data to slave | Data to slave | Block Count | Repeated START, then Slave address/Read | Repeated START, then SA/R | Repeated START, then SA/R | Repeated START, then SA/R | Byte count |
| 3 | [PEC] | Data to slave | Data to slave | Data from slave | Data from slave | Data from slave | Block count | Data to slave |
| 4 | | [PEC] | ... | [PEC] | Data from slave | Data from slave | Data from slave | ... |
| 5 | | | [PEC] | | [PEC] | Data from slave | ... | Repeated START, then SA/R |
| 6 | | | | | | Data from slave | [PEC] | Byte count |
| 7 | | | | | | [PEC] | | Data from slave |
| 8 | | | | | | | | ... |
| 9 | | | | | | | | [PEC] |

In practice, numerous messages including error messages may be communicated to the CPLD 402. For example, error messages may be related to chassis management or ICMB messages (categorized as "Chassis"), computing usage (categorized as "Management Engine" or "ME" 406d) and functions of the PCH 408 or any external server coupled to the PCH 408 (categorized as "Server"). Error messages may also relate to management of a data center, such as the data center 310, communicably coupled to the PCH 408 (categorized as "Data Center Management Interface" or "DCMI"). Further, error messages may relate to routing of messages over the bus 407 (categorized as "Transport"), to errors on storage units (categorized as "Storage") or to events occurring on the BIOS 403. The access policies 414 dictate whether a message may be allowed to be transmitted to the BMC 412 or blocked.

Depending on the action, the corresponding access policy 414 may include additional data. For example, some messages that may be allowed could correspond to a platform event associated with the BIOS 403. Further, the message may include details indicative of the platform event. One of the access policies 414 may be matched to the message, and it may be determined that the message is an authorized control plane message such as a control plane error message. In accordance with the matched access policy, the message may be allowed to be transmitted to the BMC 412. The message could be an error message and may include a command to fill a system event log (SEL) 426 on the BMC 412. Further error messages could include a command to add an entry to the SEL 426 on the BMC 412, is allowed to be transmitted. Yet another error message that may be allowed to access the BMC 412 could pertain to requesting Comrecover from a system crash event. Any command making unauthorized changes to the watchdog timer may compromise the working of the computing device 400. Accordingly such error messages are blocked from being transmitted to the BMC 412.

In some embodiments, the logic device 402 compares a memory location of the error message to one or more memory locations stored in access policies 414. The logic device 402 controls transmission of the error message to the BMC 412 based on the comparison. If the memory location included in the error message matches at least one memory location of the one or more memory locations stored in the one or more access policies, the error message is transmitted to the BMC 412 over the hardware component interface 420. If the memory location included in the error message does not match the one or more memory locations stored in the one or more access policies, the error message is blocked from being transmitted to the BMC 412.

In some embodiments, a masking access policy may cause data to be read from a particular address or addresses to be replaced with different data. In some embodiments, the masking access policy may define that data read from a memory be replaced with all 0s or 1s, or with random values. Accordingly, rather than merely blocking to specific addresses, various actions may be performed on the message. In some embodiments, the requested address may be modified to a different address on a read request. In other embodiments, an error message may be blocked while a message indicating that the error message has been received may be returned. In other embodiments, the error message may be returned to its source. Alternatively, the data may be replaced with specific values, such as replacing a serial number or identifier with a masked serial number or identifier.

In various embodiments, policies may be updated by making changes to the truth table (e.g., adding, removing, or changing patterns stored in the truth table or other policy data structure). Such changes may be made by a service provider or by a customer. In some embodiments, address policies may be hardwired in the logic device 402 and may not be updated while the computing device 400 is running. The logic device 402 may be reprogrammed to update the policies, when the computing device 400 is offline. Although the access policies 414 are shown as included in the logic device 402, in alternative embodiments, the access policies 414 may be centrally located in a data center or a service provider environment, or any other location accessible to the logic device 402.

Figure 5:
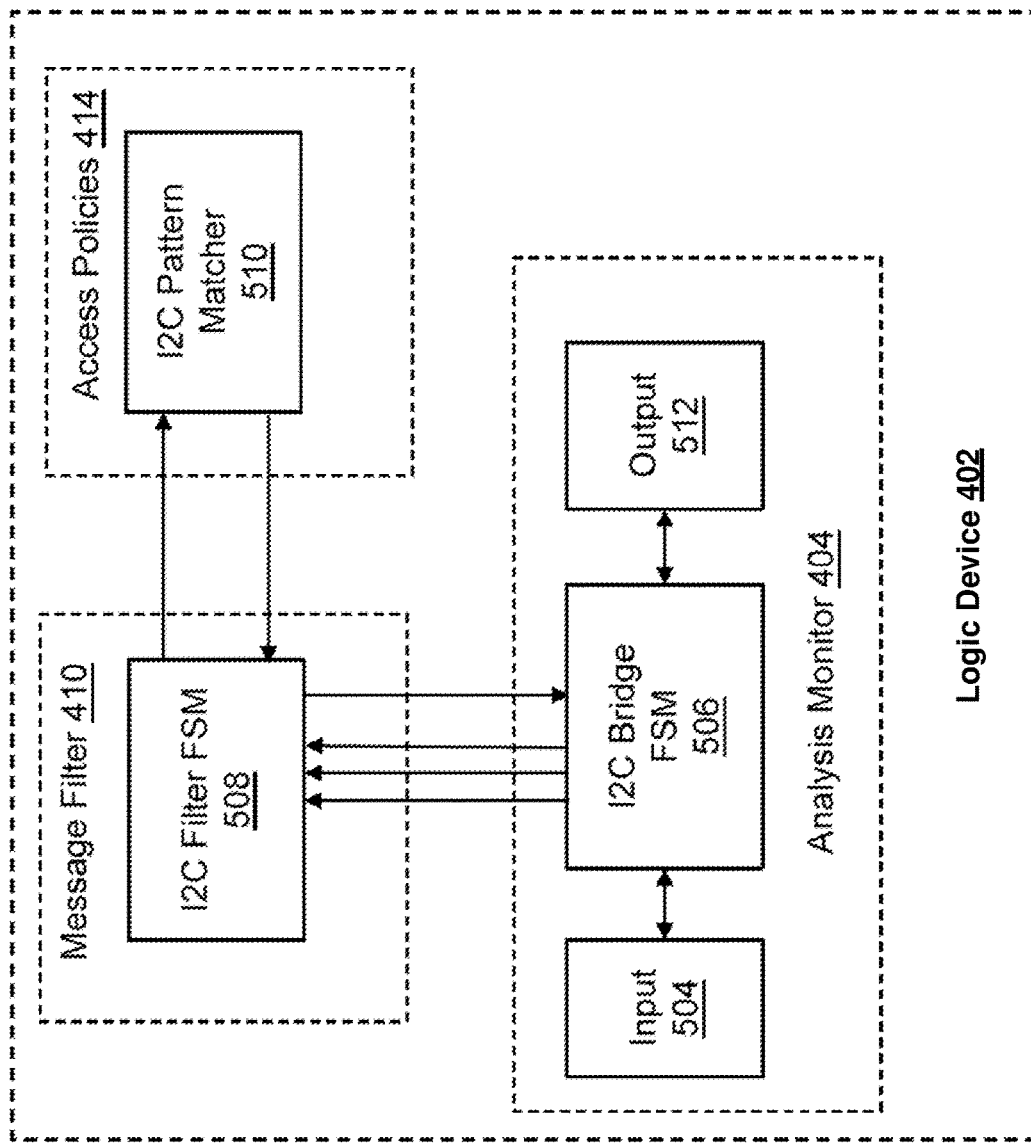
FIG. 5 illustrates a finite state machine implementation of error handling using a programmable logic device, in accordance with an embodiment.

FIG. 5 illustrates a finite state machine 500 implementing secure error handling as implemented by the logic device 402 (shown in FIG. 4), in accordance with various embodiments. As shown in FIG. 5, error handling may be implemented over an I2C protocol in the logic device 402. As previously noted, further embodiments can use other protocols, such as PCI-e, I2C, SMBus, SMBus System Interface (SSIF), Intelligent Platform Management Bridge/Bus (IPMB), PMBus, SPI, Intelligent Chassis Management Bus (ICMB) or any other protocol.

A message over the I2C may be received at input 504 and passed to an I2C bridge finite state machine (hereinafter FSM) 506. The bridge FSM 506 may act as the analysis monitor 404 (shown in FIG. 4). The bridge FSM 506 may determine a command from the message packet. The command may pertain to a platform event. This data may be passed to a filter FSM 508. The filter FSM 508 may be an implementation of the message filter 410 (shown in FIG. 4) and performs filtering of the messages based on the access policies. The filter FSM 508 can also pass the details of the message to a pattern matcher 510. The pattern matcher 510 may define one or more read/write sequences that represent known commands (such as SMBUS commands). These specific sequences or patterns can be identified by the filter FSM 508 using the pattern data of pattern matcher 510. Based on the match, the pattern matcher 510 can return policy details, which might be a write block parameter whose value indicates whether the message may be allowed. For example, if write block is 1, the bridge FSM 506 may allow the write. The message is passed to an output 512 and a response indicative of transmission of the message may be returned to the platform controller hub 408 (shown in FIG. 4).

In some embodiments, multiple filter FSMs may be used, each matching different patterns. For example, a filter FSM may be configured to match a write address for an EEPROM (which may include a 7-bit address and write flag). Upon matching the pattern, the write can be allowed. If the pattern is not matched, a stop condition may be forced to the output 512 and a "No Acknowledgement" (NACK) condition is returned. Other patterns may be used to match known commands, including IMPB commands. In some embodiments, a masking filter FSM may be configured to match a read address for an EEPROM, bus, or other address. If the read address is matched, the data being read may be replaced by data specified by the access policy. For example, the access policy may include a pointer to a different memory address including data to be provided in place of the requested data. In some embodiments, the masking filter FSM may be configured to replace all or a portion of the requested data with 0s or 1s. The portion of the requested data to be masked may be specified by the access policy.

Figure 6:
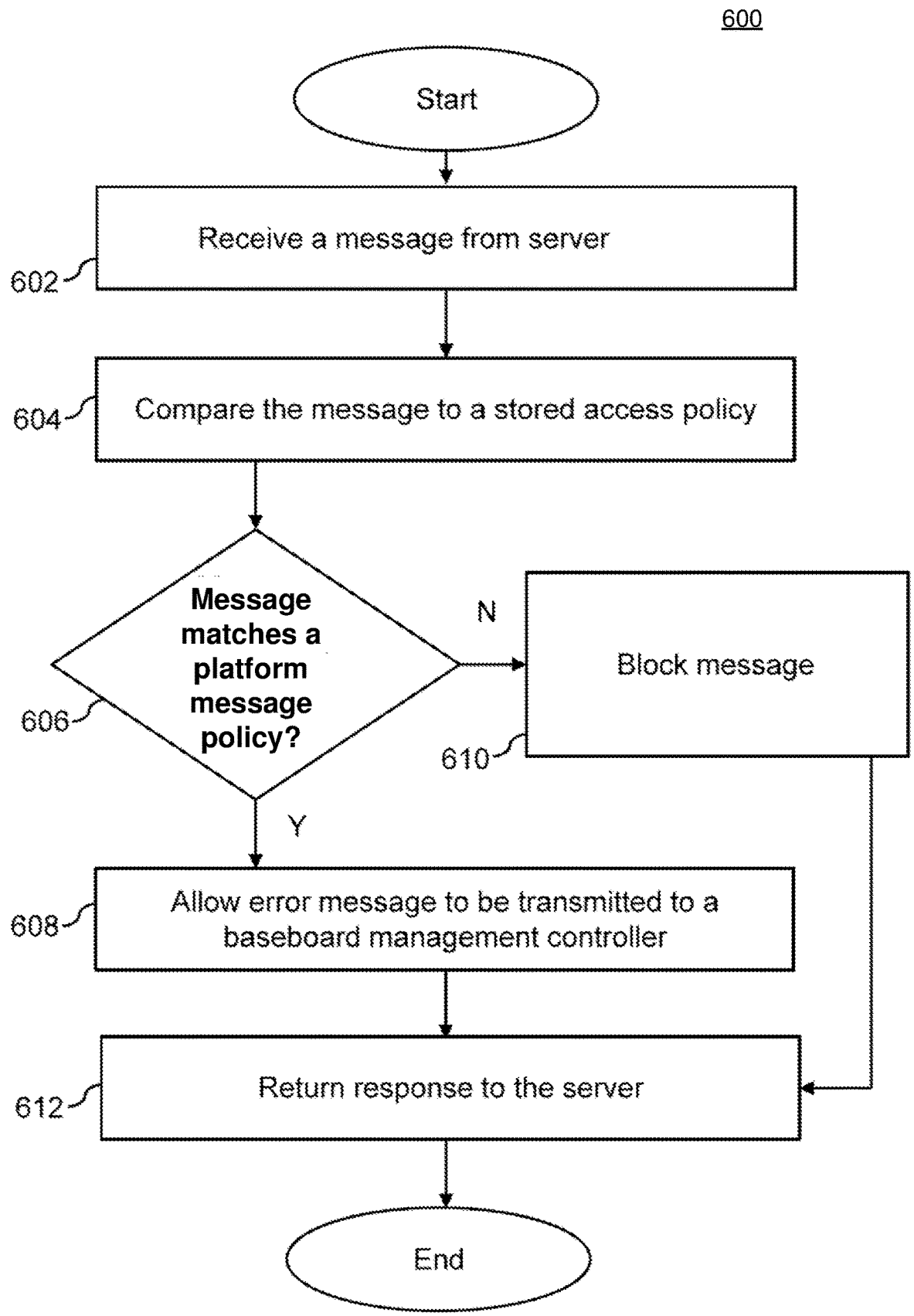
FIG. 6 illustrates a flowchart for secure error message handling using a programmable logic device, in accordance with various embodiments.

FIG. 6 illustrates a method 600 for secure message handling. The method 600 is described in the context of the computing device 400; some embodiments of the method 600 can be performed in other devices. At step 602, a message including a message type and/or memory location may be received by the logic device 402 from the PCH 408 (as shown in FIG. 4). In some embodiments, the message may be generated by the BIOS 403. Based on the type of message or based on the data components in the message packet, further action pertaining to the message is determined. At step 604, the data components in the message packet such as header data, metadata, payload data, or any other data components available to the logic device 402 associated with the message packet such as memory locations, IP addresses, etc. are compared to one or more of the access policies 414 (shown in FIG. 4). The access policies 414 may include read policies 416 and write policies 418, defined for read and write operations, respectively. The policies may be stored as truth tables or other data structures. These policies 414 may define addresses, devices, or buses over which messages may or may not be allowed. An access policy 414 may define one or more actions to be performed for a type of message or for an address or range of addresses or a memory location. At step 606, the logic device 402 checks if the message type or memory location of the message matches the corresponding entries of the access policy 414 as being an authorized control plane message type, which could include a BIOS error message, or any other authorized message type such as a read event buffer or power state message. At step 608, if the match is successful, the message is allowed to be transmitted to the BMC 412. At 610, alternatively, the message is blocked. At step 612, an appropriate response, based on the one or more access policies 414, is returned to the PCH 408 or an associate server by the logic device 402.

Figure 7:
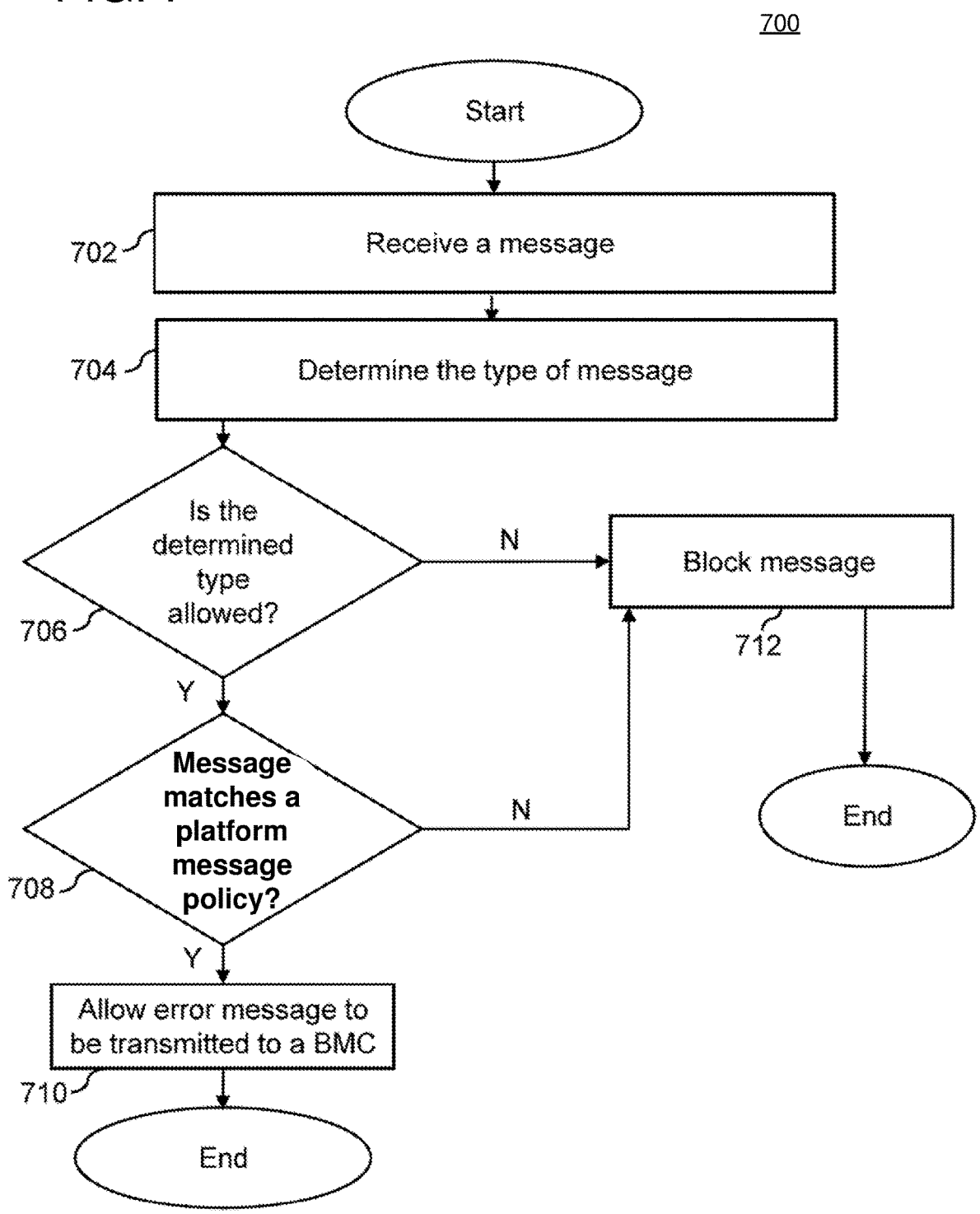
FIG. 7 illustrates a flowchart for secure error message handling using a programmable logic device, in accordance with various embodiments.

FIG. 7 illustrates a method 700 for secure message handling. The method 700 is described in the context of the computing device 400; some embodiments of the method 700 can be performed in other devices. At step 702, a message including a message type and one or more memory locations may be received by the logic device 402 from the platform controller hub 408. At step 704, the logic device 402 determines the type of message. For example, the message may be determined to have been generated by the BIOS 403 based on data components of the message. In another example, the message may be indicative of an unauthorized message such as replacing a time delay switch in the PCH 408. At step 706, in accordance with access policies 414, the logic device 402 may block unauthorized messages such as replacing a time delay switch while allowing authorized platform messages such as BIOS error message 151 to propagate to the BMC. At step 708, the data components of the message such as header data, metadata, payload data, or any other data components available to the logic device 402 associated with the message packet such as memory locations, IP addresses, etc. are compared to the access policies 414 (shown in FIG. 4) to determine if the message matches an authorized control plane message type such as a BIOS error message stored in the policies 414. The access policies 414 may include read policies 416 and write policies 418, defined for read and write operations, respectively. The access policies 414 may be stored as truth tables or other data structures. These policies may define message types, addresses, devices, or buses over which messages may or may not be allowed. An access policy 414 may define one or more actions to be performed for a type of message for an address or range of addresses or one or more memory locations. In some embodiments, the logic device 402 checks if a message type matches a message type stored in an access policy 414. If the match is successful, a first action indicative of allowing the message to be transmitted to the BMC 412 is determined. In other embodiments, the logic device 402 checks if a first memory location of the message matches a first memory location stored in an access policy 414. Accordingly, at step 710, the message is transmitted to the BMC 412.

In some other embodiments, the logic device 402 checks if a second message type of the message matches a second message type stored in the access policy 414. In some other embodiments, the logic device 402 checks if a second memory location of the message matches a second memory location stored in the access policy. In either case, if the match is successful, a second action, indicative of a masking action is determined. The second action may cause data read from a particular address or addresses to be replaced with different data. In some embodiments, a masking access policy may define that the data read from memory be replaced with all 0s or 1s, or with random values. Accordingly, rather than merely blocking a given message, various actions may be performed on the message. In some embodiments, a message may be stored in a memory, while a message indicating that the message has been received may be returned. In other embodiments, the masked message may be returned to its source. At step 712, if the message does not match a policy, the message is blocked from being transmitted to the BMC 412.

Figure 8:
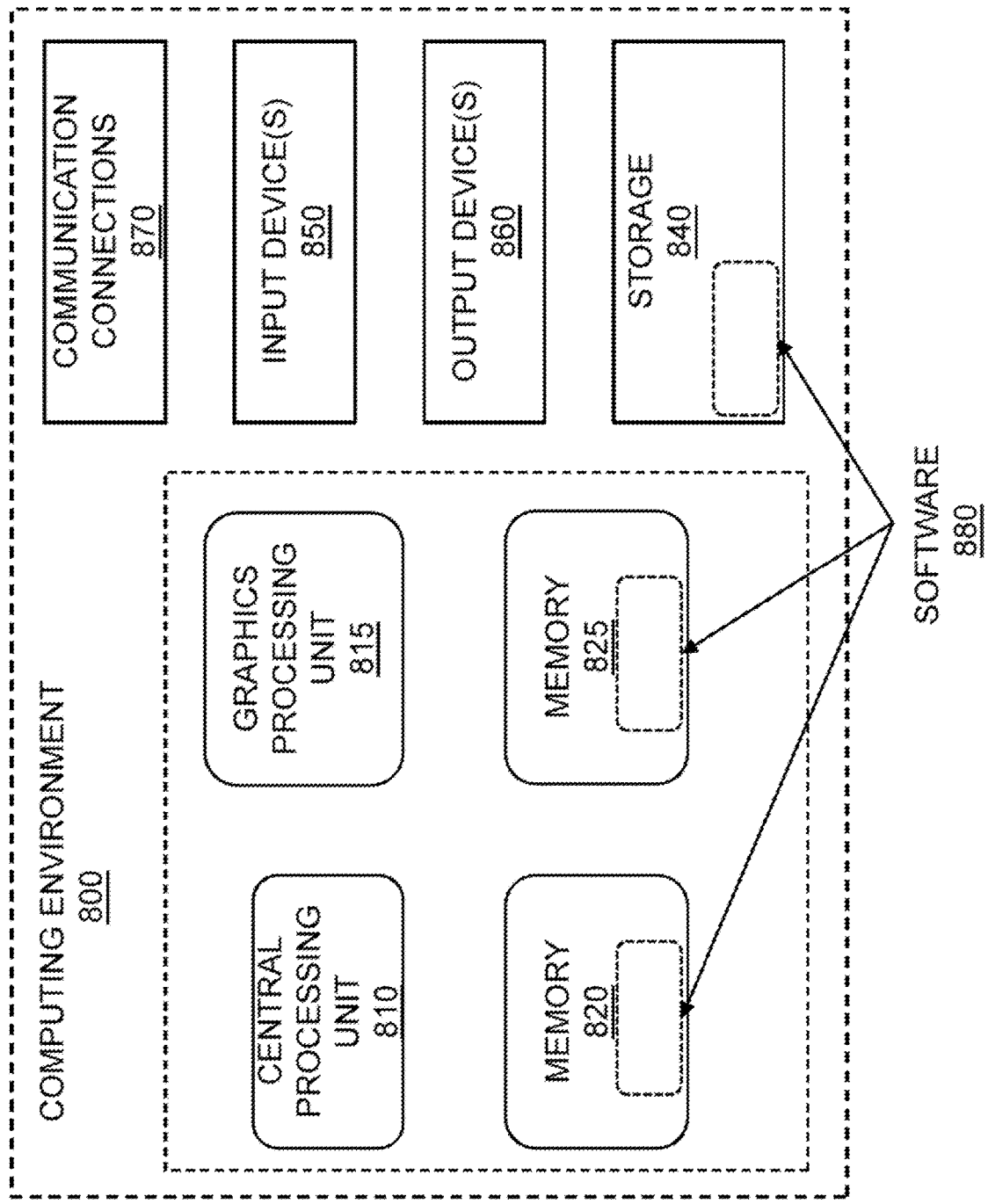
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810 and 815. The computing environment 800 further includes memory units 820 and 825. In FIG. 8, this basic configuration 830 is included within a dashed line. The processing units 810 and 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, the processing unit 810 may be a central processing unit while the processing unit 815 may be a graphics processing unit or co-processing unit. The tangible memory units 820 and 825 may be volatile memory (e.g., registers, cache, RAM), non-volatile memory (e.g., ROM, EEPROM, flash memory, etc.), or some combination of the two, accessible by the processing units 810 and 815. The memory units 820 and 825 stores software 880 implementing one or more innovations described herein, in the form of computer-executable instructions suitable for execution by the processing units 810 and 815.

The computing environment 800 may have additional features. For example, the computing environment 800 includes a storage unit 840 (or storage 840), one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, a printer, a speaker, a CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed on, but not limited to, a single local computer (e.g., any suitable commercially available computer), a network environment (e.g., via the Internet, a wide-area network, a local-area network), a client-server network (such as a cloud computing network), and the like, using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in any suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computing device comprising:
   a virtual machine instance;
   a chipset;
   a logic device in communication with the virtual machine instance and the chipset;
   a baseboard management controller (BMC) in communication with the logic device, the logic device configured to:
   receive a message, in the logic device, from the chipset or the virtual machine instance, the message including a message type;
   compare the message type of the message to a message type stored in an access policy; and
   control transmission of the message to the baseboard management controller (BMC) based on the comparison of the message type included in the message and the message type stored in the access policy, wherein the controlling of the transmission includes blocking all messages received from the virtual machine instance and allowing select messages from the chipset to pass to the BMC.

2. The computing device of claim 1, wherein the logic device is further configured to return a negative response (NAK) or a positive response (ACK) based on whether the message was transmitted to the BMC from either the chipset or the virtual machine instance.

3. The computing device of claim 1, wherein the logic device is further configured to allow the transmission of the message to the BMC if the message type included in the message matches the message type of a control plane error message stored in the access policy.

4. The computing device of claim 3, wherein the control plane error message is delivered to the logic device via an Inter-Integrated Circuit (I$^2$C) protocol bus.

5. The computing device of claim 1, wherein the logic device is further configured to block the transmission of the message to the BMC if the message type included in the message does not match any of the message types stored in the access policy.

6. The computing device of claim 1, wherein the message transmitted to the BMC is a basic input output system (BIOS) error message.

7. The computing device of claim 6, wherein the message transmitted to the BMC uses a SMBus System Interface (SSIF) protocol.

8. The computing device of claim 1, wherein the chipset receives control plane error messages from a central processing unit (CPU) or a management engine.

9. A server computer, comprising:
   a logic device for receiving messages from software or hardware configured to execute on the server computer;
   a baseboard management controller (BMC) in communication with the logic device, the logic device configured to:
   receive a message that is one of the messages, in the logic device, the message including a message type;
   compare the message type of the message to a message type stored in an access policy; and
   control transmission of the message to the baseboard management controller (BMC) based on the comparison of the message type included in the message and a message type stored in the access policy by rejecting all messages to the BMC originating from a virtual machine instance coupled to the logic device and passing select messages from a chipset coupled to the logic device.

10. The server computer of claim 9, wherein the messages are configured to be received from a virtual machine instance executing on the server computer.

11. The server computer of claim 9, wherein the message transmitted to the BMC uses a SMBus System Interface (SSIF) protocol over a server bus.

12. The server computer of claim 9, wherein the access policy includes read policies and write policies.

13. The server computer of claim 9, wherein the messages are Central Processing Unit (CPU) basic input output system (BIOS) error messages.

14. The server computer of claim 13, wherein the messages are received over an Inter-Integrated Circuit (I$^2$C) bus, a Peripheral Component Interconnect Express (PCIe) bus, or a Low Pin Count (LPC) bus.

15. The server computer of claim 9, wherein the logic device is a complex programmable logic device (CPLD).

16. A computer, comprising:
   a processor;
   a baseboard management controller (BMC);
   a chipset coupled between the BMC and the processor; and hardware logic coupled between the processor and the BMC, the hardware logic configured to filter messages transmitted to the BMC by the processor by blocking messages based on message types, wherein messages from virtual machine instances to the BMC are blocked and messages from the chipset to the BMC are allowed.

17. The computer of claim 16, further including a bus coupled between the processor and the hardware logic, wherein the bus is an Inter-Integrated Circuit ($I^2C$) bus, a Peripheral Component Interconnect Express (PCIe) bus, or a Low Pin Count (LPC) bus.

18. The computer of claim 16, further including storage within the hardware logic for storing access policies used to store the message types.

19. The computer of claim 16, wherein the processor is configured to execute virtual machines and the messages are received by the hardware logic from the virtual machines.

20. The computer of claim 16, wherein the BMC is a processor that monitors a physical state of the computer using sensors.

\* \* \* \* \*